United States Patent [19]

Morris

[11] Patent Number: 5,328,128
[45] Date of Patent: Jul. 12, 1994

[54] ARTICULATED FISHING REEL HANDLE ASSEMBLY

[76] Inventor: Brooks Morris, 32232 Azores Dr., Dana Point, Calif. 92639

[21] Appl. No.: 50,525

[22] Filed: Apr. 19, 1993

Related U.S. Application Data

[63] Continuation of Ser. No. 794,133, Nov. 14, 1991, abandoned.

[51] Int. Cl.⁵ ............................................ A01K 89/00
[52] U.S. Cl. ...................................... 242/283; 74/545
[58] Field of Search .................. 242/283, 284; 74/545, 74/546, 547

[56] References Cited

U.S. PATENT DOCUMENTS

| | | | |
|---|---|---|---|
| 1,894,985 | 1/1933 | Flowers . | |
| 2,251,163 | 7/1941 | Rennick | 74/543 |
| 2,734,693 | 2/1956 | Rabezzana | 242/84.4 |
| 2,766,956 | 10/1956 | Sarah | 242/84.6 |
| 3,250,489 | 5/1966 | Hiromitsu | 242/84.54 |
| 4,436,254 | 3/1984 | Normann | 242/231 |
| 4,830,306 | 5/1989 | Tsunoda et al. | 242/316 |

FOREIGN PATENT DOCUMENTS

| | | | |
|---|---|---|---|
| 113752 | 2/1926 | Fed. Rep. of Germany | 74/545 |
| 2278257 | 2/1976 | France | 242/284 |

*Primary Examiner*—Katherine Matecki
*Attorney, Agent, or Firm*—Stetina and Brunda

[57] ABSTRACT

An articulated fishing reel handle assembly for attachment to a fishing reel. The fishing reel handle assembly generally comprises an elongate crank arm having a first end rigidly connected to the fishing reel in a manner wherein the crank arm extends along a first axis disposed at approximately a 90-degree angle relative to an axis extending through the fishing reel. Rotatably connected to the second end of the crank arm is a bearing member which extends along a third axis disposed at approximately a 90-degree angle relative the first axis and substantially parallel to the second axis. A reel handle is rigidly connected to the distal end of the bearing member in a manner wherein the reel handle extends along a fourth axis which is angularly offset approximately 72 degrees from the third axis. The reel handle is connected to the bearing member such that the reel handle has a greater length below the third axis than above the third axis and is preferably formed of self-skinning polyurethane.

9 Claims, 1 Drawing Sheet

ARTICULATED FISHING REEL HANDLE ASSEMBLY

This application is a continuation of application Ser. No. 07/794,133, filed Nov. 14, 1991, now abandoned.

FIELD OF THE INVENTION

The present invention relates generally to fishing equipment, and more particularly, to an articulated fishing reel handle assembly for attachment to a fishing reel to provide an angler a more comfortable and natural method for retrieving line onto the fishing reel.

BACKGROUND OF THE INVENTION

Standard fishing reels and reel handle assemblies comprise a crank/lever arm which is maintained at a 90-degree angle relative the axis of rotation of the fishing reel spool and a reel handle which is maintained at a 90-degree angle relative the crank arm. Though the conventional 90-degree reel handle angle of the reel handle assembly is acceptable for lightweight fishing applications, for larger fishing applications the 90-degree angle of the reel handle relative the crank arm is not physiologically compatible with the muscle and bone structure of a human body, specifically the angler's shoulders, upper arms, forearm, and hand.

The International Gamefish Association which governs sports fishing, has established line classes for 2, 4, 8, 12, 16, 20, 30, 50, 80, and 130 pounds. The heavier line classes for sport fishing are generally categorized as 30 pounds through 130 pounds. In light tackle fishing applications wherein a line with a breaking strength of between 2 to 12 pounds is typically utilized, the 90-degree angle of the reel handle relative the crank arm does not present significant problems for the angler since the forces required to wind the line onto the reel are relatively small due to the lower drag settings which are associated with light lines. Typically, drag settings are generally set at 25 percent of the breaking strength of the line. As such, for a 12-pound line, the drag setting would typically be set at 3 pounds. After a fish is hooked, the drag setting can be increased as more line is rewound upon the reel, with the maximum drag setting being slightly under the breaking strength of the line. In this regard, for a 12-pound line the maximum drag setting would be 10 to 11 pounds. As can be appreciated, this force is not difficult to overcome by winding the reel handle. Thus, as previously indicated, the 90-degree handle to crank arm orientation does not provide a great deal of difficulty to the angler in light tackle fishing applications.

As will be recognized, the difficulty in winding a line upon a reel greatly increases as the breaking strength of the line increases. For example, assuming that an 80-pound test line is being utilized, the drag setting would be set at 25 percent of the breaking strength, i.e. 20 pounds. As previously indicated, the drag can be increased as more line is rewound upon the reel. In utilizing the 80-pound test line, the angler can safely increase the drag setting to 40 pounds. As can be appreciated, with the 40-pound drag setting the angler is subjected to significant difficulty in attempting to physically wind the line upon the reel. Such difficulty is further aggravated in that the 90-degree angle of the reel handle relative the crank arm is not physiologically compatible with the muscle and bone structure of the human body.

A further deficiency associated with prior art fishing reel handle assemblies relates to the structure of the reel handles associated therewith. In this respect, conventional reel handles typically comprise knobs which are generally constructed of wood, metal, or hard plastic. For an angler fishing ultralight to light tackle, such conventional reel handles to not present significant problems. However, at line classes of 30 pounds and higher, these particular handles become a hinderance to the angler, primarily due to the length of time the angler typically spends in attempting to land larger fish. In this respect, such handles do not offer a proper or comfortable grip, and often give rise to hand cramping, muscle fatigue, or blistering. Additionally, such handles become slippery due to perspiration thereby adding to the angler's difficulties in attempting to maintain a secure grip on the reel handle.

The present invention alleviates these and other deficiencies associated with prior art fishing reel handle assemblies.

SUMMARY OF THE INVENTION

In accordance with the preferred embodiment of the present invention, there is provided an ergonomic articulated fishing reel handle assembly for attachment to a fishing reel. The assembly generally comprises an elongate crank arm having a first end and a second end. The first end is rigidly connected to the fishing reel in a manner wherein the crank arm extends along a first axis which is disposed at approximately a 90-degree angle relative a second axis which extends through the fishing reel. Rotatably connected to the second end of the crank arm is an elongate bearing member. Importantly, the proximal end of the bearing member is connected to the crank arm in a manner wherein the bearing member extends along a third axis, i.e. an axis of rotation, which is disposed at approximately a 90-degree angle relative the first axis and which is substantially parallel to the second axis. Rigidly connected to the distal end of the bearing member is a reel handle. In the preferred embodiment, the reel handle is connected to the bearing member in a manner wherein the reel handle extends along a fourth axis which is angularly offset from the third axis. The angular offset of the reel handle relative the crank arm is typically 65 to 80 degrees and preferably 72 degrees.

Further in accordance with the preferred embodiment of the invention, the reel handle is connected to the bearing member such that the reel handle has a greater length below the third axis than above the third axis. The portion of the reel handle above the axis of rotation is adapted to accommodate the index finger and thumb of the angler's hand, while the long end, i.e. the end below the axis of rotation, is adapted to be grabbed with the bottom three fingers and palm of the angler's hand. Additionally, the reel handle is preferably formed of self-skinning polyurethane and may be formed to include finger grip recesses therein.

As such, the present invention specifically addresses the natural musculature of an angler's shoulders, arms, and hands by articulating the reel handle of the fishing reel at an angle of approximately 72 degrees relative the crank arm. The articulated reel handle provides a more comfortable and natural angle for exerting force to wind line onto the reel and thus reduces fatigue. Additionally, by having the reel handle connected to the bearing member such that a greater length lies below the axis of rotation than above the axis of rotation, upon gripping the handle, the lower three fingers of the hand are firmly seated thereupon which substantially reduces hand fatigue encountered in reeling line onto the reel. Moreover, by forming the reel handle of polyurethane, there is provided a textured, moisture-absorbing and cushion grip which reduces the potential for slippage of the angler's hand from the reel handle and also reduces occurrences of frictional blistering frequently associated with conventional reel handles.

BRIEF DESCRIPTION OF THE DRAWINGS

These as well as other features of the present invention will become more apparent upon reference to the drawings wherein.

DETAILED DESCRIPTION OF THE PREFERRED EMBODIMENT

Figure 1:
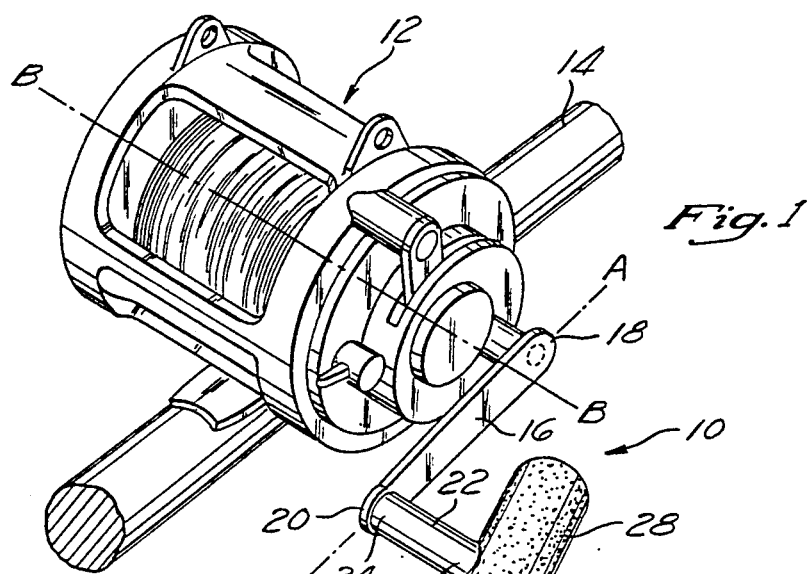
FIG. 1 is a perspective view of the reel handle assembly of the present invention as interfaced to a fishing reel.
Figure 2:
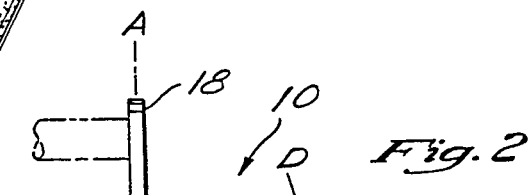
FIG. 2 is a top view of the reel handle assembly.

Referring now to the drawings wherein the showings are for purposes of illustrating a preferred embodiment of the present invention only, and not for purposes of limiting the same, FIG. 1 perspectively illustrates the reel handle assembly 10 of the present invention as interfaced to a heavy-duty fishing reel 12 of a fishing pole 14. As best seen FIGS. 1 and 2, reel handle assembly 10 generally comprises an elongate crank arm 16 having a first end 18 and a second end 20. In the preferred embodiment, first end 18 is rigidly connected to the fishing reel 12 in a manner wherein the crank arm 16 extends along a first axis A—A which is disposed at approximately a 90-degree angle relative a second axis B—B which extends through the fishing reel 12.

Rotatably connected to the second end 20 of crank arm is an elongate bearing member 22 having a proximal end 24 and a distal end 26. In the preferred embodiment, the proximal end 24 of the bearing member 22 is rotatably connected to the second end 20 in a manner wherein the bearing member 22 extends along a third axis C—C which is disposed at approximately a 90-degree angle relative the first axis A—A and substantially parallel to the second axis B—B. In the preferred embodiment, the rotatable connection between the proximal end 24 of the bearing member 22 and the second end 20 of the crank arm 16 is facilitated by a pin or other suitable bearing arrangement.

Rigidly connected to the distal end 26 of the bearing member 22 is a reel handle 28. Importantly, reel handle 28 is connected to the distal end 26 in a manner wherein the reel handle 28 extends along a fourth axis D—D which is angularly offset from the third axis C—C. The angular offset O of the reel handle 28 relative the bearing member 22, i.e. the offset of the fourth axis D—D relative the third axis C—C, is between 65 degrees and 80 degrees and is preferably 72 degrees. In accordance with a first embodiment of the present invention, the reel handle 28 is fabricated from self-skinning polyurethane and has a generally cylindrical configuration. The reel handle 28 may optionally include a rigid core therein made of aluminum or a similar material to which the distal end 26 of the bearing member 22 may be rigidly connected. As will be recognized, the angular offset 0 of the reel handle 28 relative the bearing member 22 facilitates a more natural, i.e. ergonomic, angle for exerting force to wind line onto the fishing reel 12. Additionally, the articulated reel handle 28 greatly reduces fatigue and allows the angler a more comfortable and natural method to retrieve line onto the fishing reel 12.

Figure 3:
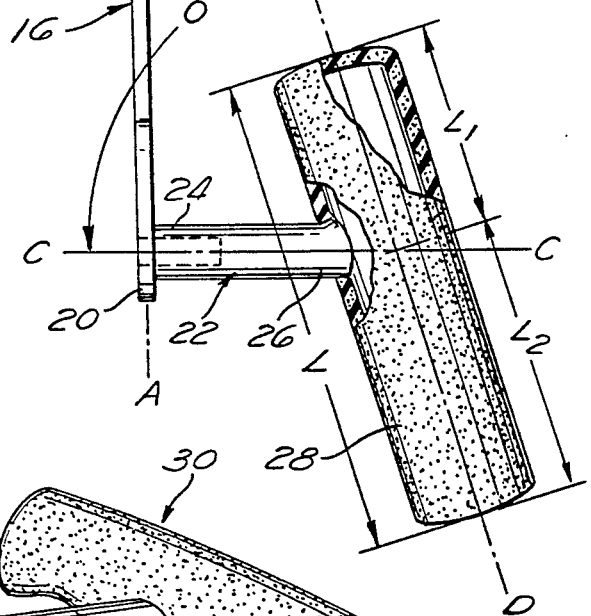
FIG. 3 is a perspective view of a second embodiment of the reel handle of the reel handle assembly.
Figure 3:
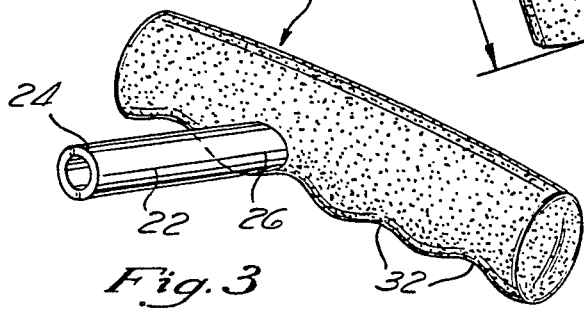

Referring now to FIG. 3, illustrated is a reel handle 30 constructed in accordance with a second embodiment of the invention. Particularly, reel handle 30 is formed to include at least four finger recesses 32 to aid in the gripping thereof by the hand of the angler. Reel handle 30, like reel handle 28, is preferably fabricated from a self-skinning polyurethane foam to provide a textured, moisture absorbing and cushion grip for the hand of the angler.

Figure 4:
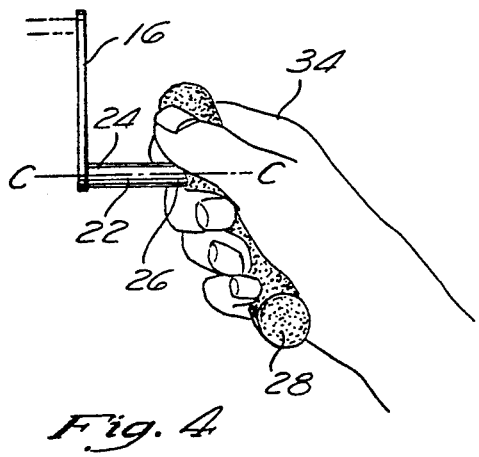
FIG. 4 is a perspective view illustrating the manner in which the reel handle is grasped by the hand of an angler.

Referring now to FIG. 4, in the preferred embodiment, the reel handles 28, 30 are connected to the distal end 26 of the bearing member 22 such that the reel handles 28, 30 have a greater length below the third axis C—C than above the third axis C—C. By attaching the reel handles 28, 30 to the bearing member 22 in this manner, the index finger and thumb of the angler's hand 34 is accommodated by the short end, i.e. the portion above the third axis C—C, while the bottom three fingers and palm of the angler's hand 34 are accommodated by the long end, i.e. the portion below the third axis C—C. Advantageously, this particular arrangement allows the angler to obtain a sturdy grip on the reel handles 28, 30 and aids in the reduction of fatigue and frictional blistering which typically occurs with conventional reel handles. Further, by orienting the reel handles 28, 30 in this manner, the greater weight of the long end of the reel handles 28, 30 causes the reel handles 28, 30 to default to a vertical orientation when not grasped by the angler's hand 34. As can be appreciated, by being vertically oriented with the long end pointing downwardly, the reel handles 28, 30 may be easily and quickly re-grasped. In the preferred embodiment, the reel handles 28, 30 preferably have an overall length L of approximately 4.9 inches. Additionally, the distance L1 of the reel handles 28, 30 which extends above the third axis C—C is preferably 2 inches while the distance L2 of the reel handles 28, 30 which extend below the third axis C—C is preferably 2.9 inches.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. An articulated fishing reel handle assembly for attachment to a fishing reel, comprising:
   an elongate crank arm defining a first axis extending longitudinally therethrough and having a first end and a second end, said first end being rigidly connected to said reel in a manner wherein said first axis extends at approximately a 90 degree angle relative a second axis defined by and extending axially through said reel;
   an elongate bearing member defining a third axis extending longitudinally therethrough and having a proximal end and a distal end, said proximal end being rotatably connected to said second end in a manner wherein said third axis extends at approximately a 90 degree angle relative said first axis and in substantially parallel relation to said second axis; and an elongate reel handle sized to extend along the palmar surface of a user's hand when grasped thereby and defining a fourth axis extending longitudinally therethrough, said reel handle having upper and lower portions and being rigidly connected to the distal end of said bearing member such that said fourth axis extends through said upper portion at an acute angle relative said third axis and through said lower portion at an obtuse angle relative said third axis.

2. The device of claim 1 wherein the angle of the fourth axis extending through the upper portion of said reel handle relative said third axis is between 65 degrees and 80 degrees.

3. The device of claim 2 wherein the angle of the fourth axis extending through the upper portion of said reel handle relative said third axis is 72 degrees.

4. The device of claim 1 wherein said reel handle is connected to said bearing member such that the lower portion of said reel handle has a greater length than said upper portion.

5. The device of claim 4 wherein said reel handle is formed of self-skinning polyurethane.

6. The device of claim 5 wherein said reel handle is formed to include at least four linearly aligned finger recesses.

7. The device of claim 4 wherein the length of said upper portion is approximately two inches and the length of said lower portion is approximately 2.9 inches.

8. An articulated fishing reel handle assembly for attachment to a fishing reel, comprising:

an elongate crank arm defining a first axis extending longitudinally therethrough and having a first end and a second end, said first end being rigidly connected to said reel in a manner wherein said first axis extends at approximately a 90 degree angle relative a second axis defined by and extending axially through said reel;

an elongate bearing member defining a third axis extending longitudinally therethrough and having a proximal end and a distal end, said proximal end being rigidly connected to said second end in a manner wherein said third axis extends at approximately a 90 degree angle relative said first axis and in substantially parallel relation to said second axis; and an elongate reel handle sized to extend along the palmar surface of a user's hand when grasped thereby and defining a fourth axis extending longitudinally therethrough, said reel handle having upper and lower portions and being rotatably connected to the distal end of said bearing member such that said fourth axis extends through said upper portion at an acute angle relative said third axis and through said lower portion at an obtuse angle relative said third axis.

9. An articulated fishing reel handle assembly for attachment to a fishing reel, comprising:

an elongate crank arm having a first end rigidly connected to said reel and a second end;

an elongate bearing member defining a first axis extending longitudinally therethrough and having a proximal end rotatably connected to the second end of said crank arm and a distal end; and an elongate reel handle sized to extend along the palmar surface of a user's hand when grasped thereby and defining a second axis extending longitudinally therethrough, said reel handle being rigidly connected to the distal end of said bearing member such that said second axis extends through an upper portion of said reel handle at an acute angle relative said first axis and through a lower portion of said reel handle at an obtuse angle relative said first axis so as to orient a user's hand at a natural, ergonomic angle relative said fishing reel to increase the user's comfort and aid the user in exerting a force to retrieve a fishing line onto the reel.

* * * * *